Patented Oct. 6, 1925.

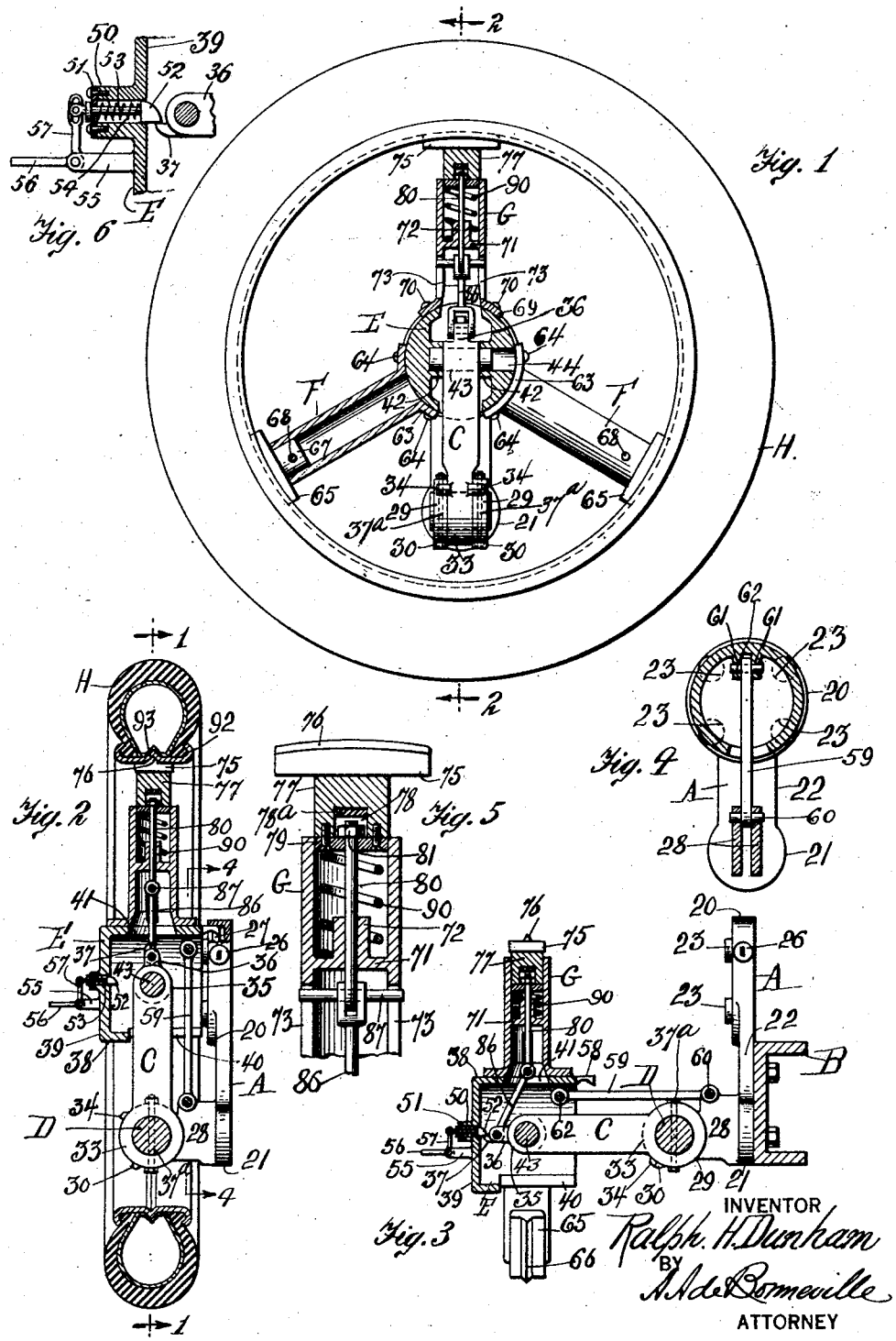

1,556,503

UNITED STATES PATENT OFFICE.

RALPH H. DUNHAM, OF JERSEY CITY, NEW JERSEY.

TIRE SUPPORT.

Application filed February 7, 1922. Serial No. 534,665.

*To all whom it may concern:*

Be it known that I, RALPH H. DUNHAM, a citizen of the United States, and resident of Jersey City, in the county of Hudson and State of New Jersey, have invented certain new and useful Improvements in a Tire Support, of which the following is a specification.

This invention relates to a tire support. The object of the invention is the production of such a device, wherewith a spare tire of a vehicle, like an automobile, can be securely clamped and locked in position to its vehicle and which can be easily detached therefrom.

The organization of the invention comprises a movable locking shoe, which is located in its locking position by means of a flexible medium, and which is unlocked by a linked mechanism, the latter withdrawing the locking shoe to its unlocking position. A plurality of stationary locking shoes co-act with the movable locking shoe.

In the accompanying drawings which exemplify one form of the invention Fig. 1 shows a side elevation of a tire with a partial section of Fig. 2 as on the line 1, 1; Fig. 2 represents a partial section of Fig. 1 in the line 2, 2; Fig. 3 indicates a section similar to Fig. 2 with the elements in a different position; Fig. 4 is a section of Fig. 2 on the line 4, 4; Fig. 5 is an enlarged fragmentary portion of Fig. 1 and Fig. 6 shows an enlarged fragmentary portion of Fig. 3.

The tire support comprises the bracket A, which is fastened to a portion B of a vehicle with which it is used. The bracket A comprises the upper circular portion 20, the lower circular portion 21 and the intermediate portion 22. Bumpers 23 of pliable material, like rubber, extend from the portion 20. A lock 26 with a locking latch 27 is provided for the said portion 20. Webs 28 which have formed therewith the annular journal supports 29 extend from the portion 21 of the bracket A. Supporting heels 30 extend from the supports 29.

A lifting arm is indicated in its entirety by the letter C. The arm C has formed at one end thereof the journal end 33, with the supporting heels 34, while at its other end is formed the journal end 35 with the projecting journal bracket 36. A latch hook 37 extends from the bracket 36. A shaft D extends through the supports 29 of the bracket A and the journal end 33 of the lifting arm C. Bolts 37ª extend through the supports 29 and the shaft D.

A hub is indicated in its entirety by the letter E and comprises the cylindrical wall 38 and the outside end wall 39. Openings 40 and 41 are formed with the wall 38. Journal bearings 42 for the journal pin 43 are formed with the hub E. The pin 43 extends through the journal end 35 of the lifting arm C. An opening 44 is formed in the hub E to enable the pin 43 to be located in place. A tubular extension 50 with the cap 51 is formed with the wall 39 of the hub E. A latch 52 with the shank 53 is slidably supported in the extension 50. A spring 54 encircles the shank 53 and bears between the cap 51 and the latch 52. A post 55 extends from the wall 39. A bell crank is indicated with the arms 56 and 57 and is pivoted to the post 55. The arm 57 is pivoted at its outer end to the shank 53. The latch 52 is in the path of the latch hook 37. A latch hook 58 extends from the upper portion of the wall 38.

A parallel arm 59 has one end pinned to the webs 28 by means of the pin 60, and its other end is pinned to bearing 61 in hub E by means of the pin 62.

Tubular supporting arms are indicated in their entireties by the letters F and G. The said arms are located in radial directions with respect to the horizontal axis of the hub E, and in this instance are three in number and one hundred and twenty degrees apart. Each of the supporting arms F has formed therewith a flange 63, which latter is fastened to the wall 38 of the hub E by means of the bolts 64. Stationary locking shoes 65 have each formed therewith the locking ridge 66 and the shank 67. The shanks 67 are inserted in the outer ends of the arms F and fastened thereto by means of the pins 68. The arm G has formed therewith the flange 69, which bears on the wall 38 of the hub E and is fastened thereto by means of the bolts 70. A cross wall 71 with the tubular guide sleeve 72 is formed with the arm G. Guide openings 73 are formed in the tubular arm G. An adjustable locking shoe 75 with the locking ridge 76 respectively similar to 65 and 66, has extending therefrom the extension 77, with the cavity 78 in the roof of which is fastened a pliable lining 78ª. A cap 79 is detachably fastened to the extension 77. A rod 80 at one end extends through the cap 79 and is threaded for the nut 81. A link 86 at one end is hinged to the lower end of the rod 80, by means of the pin 87, which latter is guided in the guide openings 73. The lower end of the link 86 is hinged to the bracket 36. A spring 90 extends around the guide sleeve 72 and bears between the cap 79 and the wall 71.

A tire is indicated in its entirety by the letter H, and is shown with its ring 92 having the circumferential depression 93.

To use the tire support the lifting arm C is brought to its horizontal and lowered position as indicated in Fig. 3, in which the supporting heels 34 of the arm C bear against the supporting heels 30 of the journal supports 29, whereby the arm C is maintained in its horizontal position. The tire H with its ring 92 is located upon the locking shoe 75, with its locking ridge 76 engaging the depression 93 of said ring. The lifting arm C is then brought to a vertical position as indicated in Figs. 1 and 2, and the lower portion of the ring 92 is locked with the locking shoes 65. Before the arm C is brought to a vertical position, the operator bears down on the bell crank arm 56 and thereby releases the latch 52 from the latch hook 37, and the tension of the spring 90 forces up the extension 77 with its locking shoe 75, the vertical position of the link 86 enabling the said spring 90 to extend. Thereby said shoe 75 is locked with the upper portion of the ring 92 and the locking shoes 65 become locked with the lower portion of said ring. When the tire is located in its raised position and locked with the locking shoes of the support, the operator by means of the lock 26 locks the latch 27 with the latch hook 58 and the tire support is securely locked in position. When the spring 90 forces up the extension 77, its tension assists in lifting the tire and movable portion of the support. To obtain flexibility for the support the top end of the rod 80 can rise in the cavity 78 an amount a little less than the altitude of the ridge 76.

To dismount the tire H from its support the latch 27 of the lock 26 is disengaged from the latch hook 58, and the tire support with the tire, is brought to its lowered position, by swinging the lifting arm C to its horizontal position. As the lifting arm C swings to its horizontal position the rod 80 is pulled down through the intervention of the link 86, and the tubular extension 77 with the locking shoe 75 is lowered against the tension of the spring 90. Thereby the locking ridge 76 of the shoe 75 is disengaged from the depression 93 of the ring 92. At the same time the latch hook 37 is locked with the latch 52 and the tire H can be lifted from the support. The parallel arm 59 maintains the hub E in proper position for the coaction of the latch 52 and the latch hook 37 and to enable the link 86 to function.

Various modifications may be made in the construction of the tire support without departing from the spirit thereof, and the present exemplification is only to be taken as illustrative and not limitative thereof.

Having described the invention what I desire to secure by Letters Patent and claim is:—

1. In a tire support the combination of a lifting arm, a hub hinged to the swinging end of the lifting arm, a pair of supporting arms extending from the hub, a stationary locking shoe for the outer end of each of the supporting arms, a third supporting arm extending from the hub, a movable locking shoe for the outer end of the third supporting arm, and a linked connection between the movable locking shoe and the lifting arm.

2. In a tire support the combination of a lifting arm, a hub hinged to the lifting arm, supporting arms extending from the hub, a stationary locking shoe at the outer end of each of said arms, another supporting arm extending from the hub, a movable locking shoe for the outer end of the latter arm, a spring to normally move the latter locking shoe outwardly, a link with one end hinged to the lifting arm, and a rod with one end hinged to the other end of said link, the other end of the rod connected to the movable locking shoe.

3. In a tire support the combination of a lifting arm, a hub hinged to the swinging end of the lifting arm, supporting arms extending from the hub, stationary locking shoes for the outer ends of the supporting arm, a tubular supporting arm extending from the hub, a movable locking shoe with an extension, said extension slidably supported in the outer end of the tubular arm, a linked connection between the movable shoe and said lifting arm and a flexible medium bearing up against the extension of the movable shoe.

4. In a tire support the combination of a lifting arm, a hub hinged to the swinging end of the arm, supporting arms extending from the hub, stationary locking shoes for the outer ends of the supporting arms, a tubular arm extending from the hub, a cross wall formed in the latter arm, a movable locking shoe, an extension for the latter shoe slidably supported in the outer end of the tubular arm, a rod extending from said extension, through the cross-wall in the tubular arm, a link connecting said rod and the lifting arm and a spring bearing between the extension of the movable shoe and the wall in the tubular arm.

5. In a tire support the combination of a lifting arm, a hub hinged to the swinging end of the arm, locking means between the lifting arm and the hub, supporting arms extending from the hub, stationary locking shoes for the supporting arms, a tubular supporting arm extending from the hub, a movable locking shoe with an extension, said extension slidably supported in the outer end of the tubular arm, a linked connection between the extension of the movable shoe and said lifting arm and a flexible medium in the tubular arm bearing up against said extension.

6. In a tire support the combination of a bracket having journal supports formed therewith, supporting heels for the journal supports, a lifting arm with one end thereof hinged to said journal supports, supporting heels for the lifting arm bearing on the supporting heels of the journal supports when the lifting arm is located in its lowered position, a hub hinged to the outer end of the lifting arm, a parallel arm with one end thereof pinned to said bracket and the other end pinned to said hub, a latch hook extending from the outer end of the lifting arm, a spring actuated latch supported on said hub and adapted to lock with said latch hook when the lifting arm is located in its lowered position, a latch hook extending from the hub, a lock for said bracket locking with said latch hook when the lifting arm is located in its elevated position and means extending from the hub to support a tire.

7. In a tire support the combination of a bracket, a lifting arm with one end thereof hinged to the bracket, a hub hinged to the other end of the lifting arm, a plurality of locking means extending from the hub to support a tire, a flexible medium bearing against one of said means and assisting in raising the lifting arm and the tire when they are lifted to their raised position, and a parallel arm with one end pinned to the bracket and its other end pinned to the hub.

Signed at the borough of Manhattan, city of New York in the county of New York and State of New York this 23d day of January A. D. 1922.

RALPH H. DUNHAM.